United States Patent
Hakamata

(10) Patent No.: US 7,193,234 B2
(45) Date of Patent: Mar. 20, 2007

(54) IMAGE INFORMATION READOUT EXPOSURE APPARATUS

(75) Inventor: Kazuo Hakamata, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 167 days.

(21) Appl. No.: 10/857,501

(22) Filed: Jun. 1, 2004

(65) Prior Publication Data

US 2004/0246366 A1    Dec. 9, 2004

(30) Foreign Application Priority Data

Jun. 5, 2003    (JP) .............................. 2003/160683

(51) Int. Cl.
*H04N 5/238* (2006.01)

(52) U.S. Cl. .................................... 250/580

(58) Field of Classification Search ................ 250/580, 250/581; 348/370
See application file for complete search history.

(56) References Cited

U.S. PATENT DOCUMENTS

| | | | |
|---|---|---|---|
| 6,268,614 B1 * | 7/2001 | Imai | 250/591 |
| 6,373,063 B1 | 4/2002 | Imai | |
| 6,376,857 B1 * | 4/2002 | Imai | 250/591 |
| 6,774,385 B2 * | 8/2004 | Imai | 250/580 |
| 6,953,945 B2 * | 10/2005 | Imai | 250/591 |
| 7,005,664 B2 * | 2/2006 | Mitchell et al. | 250/585 |
| 2001/0030305 A1 | 10/2001 | Shoji | |

* cited by examiner

*Primary Examiner*—Otilia Gabor
(74) *Attorney, Agent, or Firm*—Sughrue Mion, PLLC

(57) ABSTRACT

An image information readout exposure apparatus includes: a first light source, for performing readout scanning exposure on an image information recording medium, on which image information is recordable as an electrostatic latent image, to read out image information recorded thereon; and a second light source, for performing scanning exposure on the image information recording medium, which is different from the readout scanning exposure performed by the first light source. The first and second light sources include an integrated illuminating portion and means for scanning the illuminating portion. The first and second light sources may be linear light sources. If so, the illuminating portion may include an optical path changing means, for changing an optical path of light emitted from at least one of the first and second light sources, so that a position illuminated by the first light source and a position illuminated by the second light source substantially match.

14 Claims, 2 Drawing Sheets

IMAGE INFORMATION READOUT EXPOSURE APPARATUS

BACKGROUND OF THE INVENTION

1. Field of the Invention

The present invention relates to an image information readout exposure apparatus comprising a first light source, for performing readout scanning exposure on an image information recording medium, on which image information is recordable as an electrostatic latent image, to read out image information recorded thereon; and a second light source, for performing scanning exposure, which is different from the readout scanning exposure performed by the first light source, on the image information recording medium.

2. Description of the Related Art

Conventionally, there are known image information readout exposure apparatuses. These apparatuses comprise a first light source, for performing readout scanning exposure on an image information recording medium, on which image information is recorded as an electrostatic latent image, to read out image information recorded thereon; and a second light source, for performing scanning exposure, which is different from the readout scanning exposure performed by the first light source, on the image information recording medium.

For example, in medical radiation imaging and the like, image recording media comprising photoconductive bodies such as selenium plates are employed. This is to reduce the amount of radiation that a subject is exposed to, and to improve diagnostic properties. Radiation, which has passed through the subject, is irradiated onto the image recording medium, to accumulate charges corresponding to the amount of radiation irradiated thereon. The accumulated charges are stored in a charge accumulating portion of the image recording medium, thereby recording a radiation image as an electrostatic latent image. During readout of image information, a readout light, such as a laser beam or a line light, is scanned and exposed on the image recording medium by an image information readout exposure apparatus. Thereby, the image information (electrostatic latent image) is read out.

It is often the case that exposure to erase charges or dark current charges is performed (as disclosed in U.S. Pat. No. 6,268,614 and U.S. Patent Laid-Open No. 20010030305), in order to improve the readout accuracy of image information. Alternatively, exposure may be performed to cause optical fatigue prior to recording (as disclosed in U.S. Pat. No. 6,373,063). In addition, there are cases in which exposure to obtain a readout range or dark current correction data is performed prior to the readout scanning exposure.

A planar light source may be employed as the second light source for performing exposure, which is different from the readout scanning exposure. However, it is desirable, from the viewpoint of cost, that a line light source or a point light source be employed. On the other hand, in the case that a line light source or a point light source is employed, a separated scanning means, for scanning these light sources, becomes necessary. Therefore, there is a problem that the use of these light sources is a barrier to lowering the manufacturing cost of an exposure apparatus.

SUMMARY OF THE INVENTION

The present invention has been developed in view of the aforementioned problem. It is an object of the present invention to provide an image information readout exposure apparatus comprising: a first light source, for performing readout scanning exposure; and a second light source, for performing scanning exposure different from the readout scanning exposure, wherein the manufacturing cost therefore is reduced.

The image information readout exposure apparatus according to the present invention comprises:

a first light source, for performing readout scanning exposure on an image information recording medium, on which image information is recordable as an electrostatic latent image, to read out image information recorded thereon; and a second light source, for performing scanning exposure, which is different from the readout scanning exposure performed by the first light source, on the image information recording medium; wherein:

the first and second light sources comprise an integrated illuminating portion, and a scanning means for scanning the illuminating portion.

Here, "the scanning exposure, which is different from the readout scanning exposure" includes a variety of scanning exposures, which are different from the readout scanning exposure. Specific examples of the scanning exposure are that for erasing residual charges, that for causing optical fatigue prior to recording, and that for discharging unnecessary accumulated charges, which are accumulated in a charge accumulating portion, performed prior to imaging.

In the case that the first and the second light sources are linear light sources, a configuration may be adopted wherein:

the illuminating portion comprises an optical path changing means, for changing the optical path of the light emitted from at least one of the first and second light sources, so that the position illuminated by the light emitted from the first light source and the position illuminated by the light emitted from the second light source substantially match. The optical path changing means may be a dichroic mirror.

The image information readout exposure apparatus according to the present invention comprises an illuminating portion, in which a first light source and a second light source are integrated, and a scanning means, for scanning the illuminating portion. Therefore, an expensive planar light source and a scanning means for scanning the second light source, which had heretofore been necessary, are obviated. Thereby, the manufacturing cost may be reduced.

In the case that the first light source and the second light source are linear light sources, a configuration may be adopted wherein:

the illuminating portion comprises an optical path changing means, for changing the optical path of the light emitted from at least one of the first and second light sources, so that the position illuminated by the light emitted from the first light source and the position illuminated by the light emitted from the second light source substantially match. In this case, the space in the scanning direction, required to scan the illuminating portion, may be reduced.

In the case that the optical path changing means is a dichroic mirror, the optical path may be changed efficiently, with a simple structure.

DETAILED DESCRIPTION OEXEMPLARY EMBODIMENTS

Figure 1:
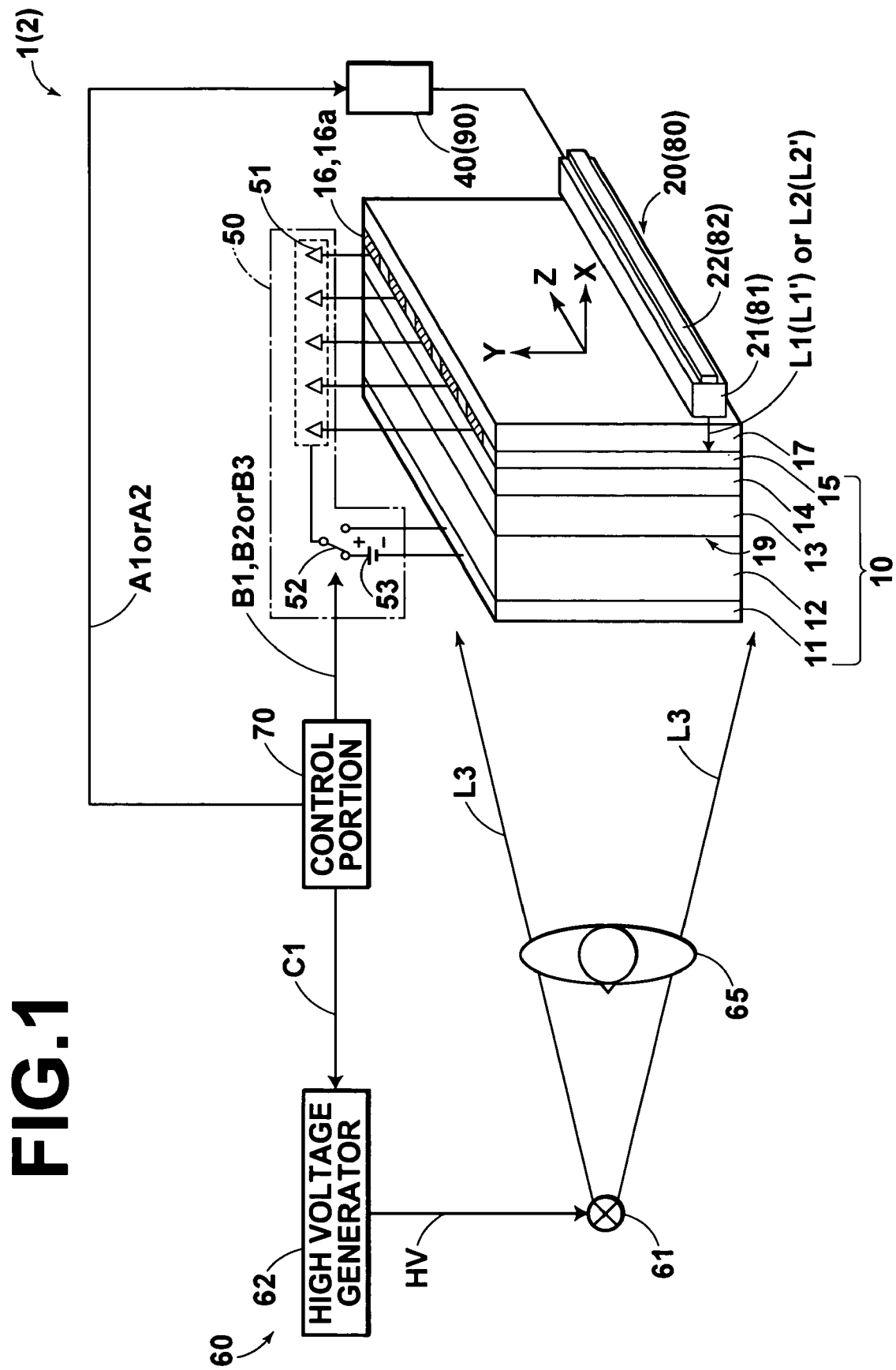
FIG. 1 is a schematic diagram of an image information recording/readout apparatus, to which a readout exposure portion according to a first embodiment of the present invention is applied.

Hereinafter, embodiments of the present invention will be described with reference to the attached drawings. FIG. 1 is a schematic diagram of an image information recording/readout apparatus 1, to which a readout exposure portion according to a first embodiment of the present invention is applied. The image information recording/readout apparatus 1 may function as an image information readout exposure apparatus, and employs a readout exposure portion according to the present invention.

As illustrated in FIG. 1, the image information recording/readout apparatus 1 comprises: an image recording medium 10; an illuminating portion 21; a scanning portion 22; a scanning exposure control portion 40; a current detecting circuit 50; a radiation emitting portion 60; and a control portion 70. The image recording medium 10 is capable of recording an electrostatic latent image therein. The illuminating portion 21 emits pre-exposure light L2 and readout light L1 onto the image recording medium 10. The scanning portion 22 scans the illuminating portion 21. The illuminating portion 21 and the scanning portion 22 constitute a readout exposure portion 20. The scanning exposure control portion 40 controls the readout exposure portion 20. The current detecting circuit 50 reads out charges from the image recording medium 10. The radiation emitting portion 60 emits radiation L3, which is recording light. The control portion 70 is connected to the scanning exposure control portion 40, the current detecting circuit 50, and the radiation emitting portion 60.

The image recording medium 10 comprises: a first electrode layer 11 (conductive layer); a recording light photoconductive layer 12; a charge transport layer 13; a charge accumulating portion 19; a second electrode layer 15 (conductive layer); and a readout light photoconductive layer 14. When radiation L3 (X-rays, for example), which has passed through a subject and bears image information, is irradiated onto the first electrode layer 11, charges are generated within the recording light photoconductive layer 12. The charges are accumulated as latent image charges at the charge accumulating portion 19, which is the interface between the recording light photoconductive layer 12 and the charge transport layer 13. When the second electrode layer 15 is scanned with readout light L1, charges are generated within the readout light photoconductive layer 14. These charges couple with the latent image charges and generate current corresponding to the amount of the latent image charges. Note that a transparent substrate 17 transmits the readout light L1 and the pre-exposure light L2.

The second electrode layer 15 comprises a great number of linear electrodes (the hatched portion in the figures), which are arranged in stripes. Hereinafter, the electrodes of the second electrode layer 15 will be referred to as stripe electrodes 16, and each of the linear electrodes will be referred to as an element 16a. Materials having a-Se, which is an amorphous material, as the main component thereof, are utilized for the recording light photoconductive layer 12, the charge transport layer 13, and the readout light photoconductive layer 14. Note that the stacking direction of the recording light photoconductive layer 12, the charge transport layer 13, the readout light photoconductive layer 14, the second electrode layer 15, and the transparent substrate 17 is designated as the X direction, as illustrated in FIG. 1. The longitudinal direction of the stripe electrodes 16 is designated as the Y direction, and the longitudinal direction of the illuminating portion 21 is designated as the Z direction.

Figure 2:
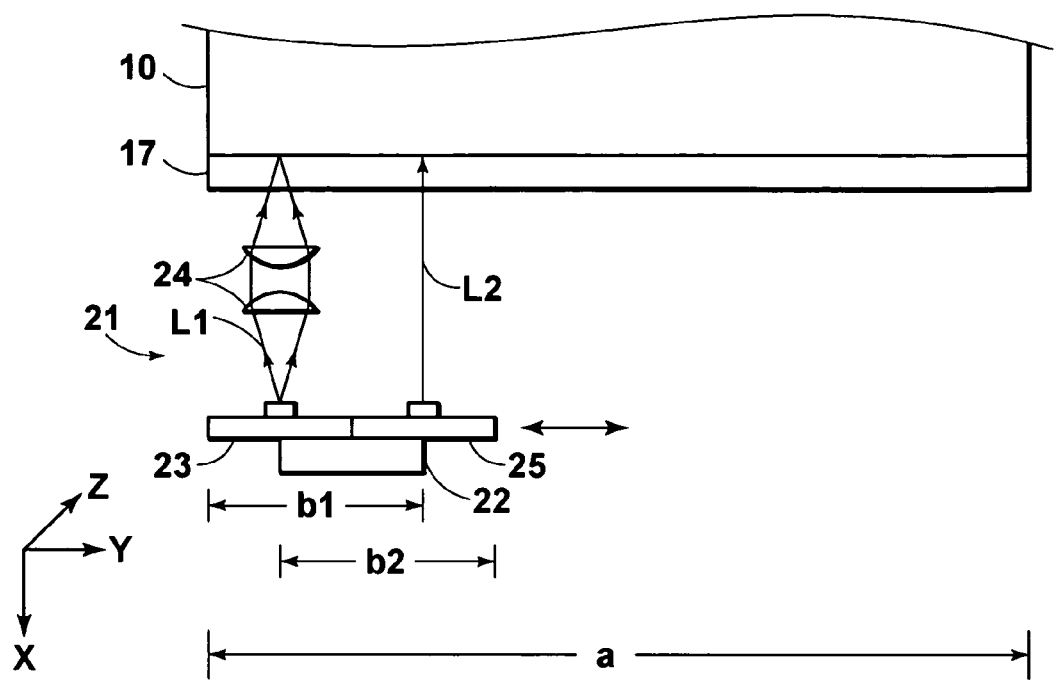
FIG. 2 is a schematic sectional view of the readout exposure portion according to the first embodiment of the present invention.

FIG. 2 is a sectional view of the illuminating portion 21 along the X-Y plane. The illuminating portion 21 comprises: a readout light source 23, which is a first light source; a focusing optical system 24; and a pre-exposure light source 25, which is a second light source. The readout light source 23 comprises a great number of LEDs that emit light at wavelengths of approximately 460 nm, which are arranged linearly in the Z direction. The focusing optical system 24 comprises two cylindrical lenses that extend in the Z direction, and focuses light emitted from the readout light source 23, that is, readout light L1, on the image recording medium 10, as a line extending in the Z direction. The pre-exposure light source 25 comprises a great number of EL (electrical luminescence) lamps that emit light at wavelengths of approximately 460 nm, which are arranged linearly in the Z direction. The readout light source 23 and the pre-exposure light source 25 both emit light in the X direction, and are integrally formed in rows. The focusing optical system 24 is fixed to the readout light source 23 and the pre-exposure light source 25 by a mounting member (not shown).

The scanning portion 22 scans the illuminating portion 21 in the Y direction, according to control by the scanning exposure control portion 40. Note that the length of the image recording medium 10 in the Y direction is designated as a, the distance from the emission position of the pre-exposure light L2 to the left edge of the illuminating portion 21 is designated as b1, and the distance from the emission position of the readout light L1 to the right edge of the illuminating portion 21 is designated as b2, as illustrated in FIG. 2. In this case, in order to scan the entire surface of the image recording medium 10 with the readout light L1 and the pre-exposure light L2, it is necessary to secure scanning space for the illuminating portion 21 of at least a distance of b1 to the left of the length a and of a distance of b2 to the right of the length a.

The current detecting circuit 50 comprises a great number of current detecting amplifiers 51. Each current detecting amplifier 51 corresponds to an element 16a of the stripe electrodes 16. The current detecting amplifiers 51 are connected to inverting input terminals. The first electrode layer 11 of the image recording medium 10 is connected to a first input of a switch 52 and the negative pole of a power source 53. The positive pole of the power source 53 is connected to a second input of the switch 52.

The output of the switch 52 is connected in common to non-inverting input terminals of operating amplifiers (not shown) that constitute the current detecting amplifiers 51. When the readout light L1 is irradiated (by scanning exposure) on the image recording medium 10 on the side of the stripe electrodes 16, current flows through the elements 16a. The current detecting amplifiers 51 detect the current that flows through each element 16a simultaneously (in parallel).

Note that the detailed construction of the current detecting amplifiers 51 is not related to the content of the present invention, therefore a detailed description thereof is omitted. However, it is possible to apply various known constructions therefor. It goes without saying that the manner in which the switch 52, the power source 53, and the elements 16a are connected will vary depending on the construction of the current detecting amplifiers 51.

The radiation emitting portion 60 comprises a radiation source 61 and a high voltage generator 62. The radiation source 61 emits radiation L3. The high voltage generator 62 generates electricity for driving the radiation source 61.

Note that the control portion 70 outputs either a control signal A1 or a control signal A2 to the scanning exposure control portion 40. The control portion 70 outputs one of a control signal B1, a control signal B2, and a control signal B3 to the switch 52. The control portion 70 outputs a control signal C1 to the high voltage generator 62.

The scanning exposure control portion 40 causes the readout light source 23 to emit readout light L1 and drives the scanning portion 22 if the control signal A1 is input thereto. The image recording medium 10 is exposed by scanning exposure of the readout light L1, by the illuminating portion 21 being moved from one end of the image recording medium 10 to the other end thereof. If the control signal A2 is input, the pre-exposure light source 25 is caused to emit pre-exposure light L2, and the scanning portion 22 is driven. Thereby, the image recording medium 10 is exposed by scanning exposure of the pre-exposure light L2, by the illuminating portion 21 being moved from one end of the image recording medium 10 to the other end thereof.

The switch 52 switches to the power source 53 when the control signal B1 is input thereto. Thereby, DC voltage is applied to the image recording medium 10 (specifically, between the electrodes of the first electrode layer 11 and the stripe electrodes 16 from the power source 53. On the other hand, if the control signal B2 is input, the switch 52 switches to the first electrode layer 11. Thereby, the electrodes of the first electrode layer 11 and the stripe electrodes 16 are essentially shorted, via imaginary shorts of the operating amplifiers (not shown) that constitute the current detecting amplifiers 51, and the electrical potentials of the electrodes become equal. Further, if the control signal B3 is input, the switch 52 is set at its midpoint. Thereby, the positive pole of the power source 53 is caused to be in a floating state, voltage is not applied to the image recording medium 10, and the electrical potentials of the electrodes are not equalized.

The high voltage generator supplies high voltage HV to the radiation source 61 when the control signal C1 is input thereto. Thereby, radiation L3 is emitted from the radiation source 61 for a predetermined amount of time.

Hereinafter, the operation of the image information recording/readout apparatus 1 of the above construction will be described. In the apparatus 1, to which the present invention has been applied, pre-exposure light L2 is irradiated on the image recording medium 10 to perform blank readout prior to application of recording voltage thereto, when recording a latent image thereon.

Specifically, first, the control portion 70 outputs control signal B2 to the switch 52. Thereby, the switch 52 switches to the first electrode layer 11, to essentially short the electrodes of the first electrode layer 11 and the stripe electrodes 16, and equalize the electrical potentials thereof. Next, control signal A2 is output to the scanning exposure control portion 40. Thereby, pre-exposure light L2 is caused to be emitted from the pre-exposure light source 25, and the scanning portion 22 is driven, to perform blank reading of the readout light photoconductive layer 14 by scanning exposure of the pre-exposure light L2.

After the blank reading is performed, recording radiation L3 is irradiated on the first electrode layer 11 in a state in which a recording voltage is being applied between the first electrode layer 11 and the stripe electrodes 16. Thereby, an electrostatic latent image is recorded on the image recording medium 10. Specifically, first, control signal B1 is output to the switch 52, to cause the switch 52 to switch to the power source 53. Direct current voltage of a predetermined amount is applied between the electrodes of the first electrode layer 11 and the stripe electrodes 16 as a recording voltage, to charge the electrodes. This is to enable accumulation of the charges, which are generated in the recording light photoconductive layer 12, in the charge accumulating portion 19.

Following the application of the recording voltage, control signal C1 is input to the high voltage generator 62. High voltage HV is supplied to the radiation source 61 from the high voltage generator 62, and radiation L3 is caused to be emitted from the radiation source 61. The radiation L3 is irradiated on a subject 65. The radiation L3, which has passed through and bears radiation image information of the subject 65, is irradiated on the image recording medium 10 for a set irradiation period. Thereby, positive and negative charge pairs are generated within the recording light photoconductive layer 12. From among these charge pairs, the negative charges are concentrated at the elements 16a of the stripe electrodes 16, along a predetermined electrical field distribution. The concentrated charges are accumulated as latent image charges at the charge accumulating portion 19, which is the interface between the recording light photoconductive layer 12 and the charge transport layer 13. The amount of latent image charges is substantially proportional to the amount of irradiated radiation. Therefore, the latent image charges bear the electrostatic latent image. Meanwhile, the positive charges, which are generated in the recording light photoconductive layer 12, are drawn toward the first electrode layer 11, where they couple with negative charges, which are supplied from the power source 53, and disappear.

Next, when the electrostatic latent image is read out from the image recording medium 10, first, control signal A1 is output to the scanning exposure control portion 40. When the control signal A1 is input, the scanning exposure control portion causes the readout light source 23 to emit readout light L1 and drives the scanning portion 22. Thereby, the image recording medium 10 is scanned and exposed by the readout light L1.

Positive and negative charge pairs are generated within the readout light photoconductive layer 14 at the scanning positions of the readout light L1, that is, the positions at which readout light L1 is incident on the readout light photoconductive layer 14. From among these charge pairs, the positive charges move rapidly through the charge transport layer 13, as though drawn toward the negative charges (latent image charges), which are accumulated in the charge accumulating portion 19. The positive charges couple with the latent image charges at the charge accumulating portion 19 and disappear. Meanwhile, the negative charges, which are generated in the readout light photoconductive layer 14, couple with positive charges, which are supplied to the stripe electrodes 16 from the power source 53, and disappear. In this manner, the negative charges, which had been accumulated in the charge accumulating portion 19 of the image recording medium 10 disappear due to charge coupling. Current, due to the movement of the charges during charge coupling, is generated within the image recording medium 10. This current is simultaneously detected by each of the current detecting amplifiers 51, which are connected to each of the elements 16a. The current that flows through the image recording medium 10 during readout corresponds to the latent image charges, that is, the electrostatic latent image. Therefore, the electrostatic latent image can be read out, that is, an image signal that represents the electrostatic latent image can be obtained, by detecting the current.

In this manner, the image information recording/readout apparatus 1 performs blank reading by irradiating the readout light photoconductive layer 14 with the pre-exposure light L2, in a state in which the electrical potential of the electrodes of the first electrode layer 11 and the stripe electrodes 16 are equal. After the blank reading is stopped, the electrostatic latent image is recorded by irradiating the image recording medium 10 with the recording radiation L3, in a state in which the recording voltage is applied to the electrodes. Therefore, an optical fatigue state (trap accumulation state) is temporarily formed at the light incidence interface (electron-hole pair formation region) of the readout light photoconductive layer 14, on which the pre-exposure light L2 is irradiated. Thereby, photovoltaic noise, which may occur when the readout light L1 is irradiated, is reduced and stabilized by the optical fatigue state.

The readout exposure portion 20 according to the first embodiment of the present invention comprises the illuminating portion 21, in which the readout light source 23 and the pre-exposure light source 25 are integrated, and the scanning portion 22, for scanning the illuminating portion 21. Therefore, an expensive planar light source and separate scanning portions, for individually scanning the pre-exposure light source 25 and the readout light source 23, which had heretofore been necessary, are obviated. Thereby, the manufacturing cost may be reduced.

Figure 3:
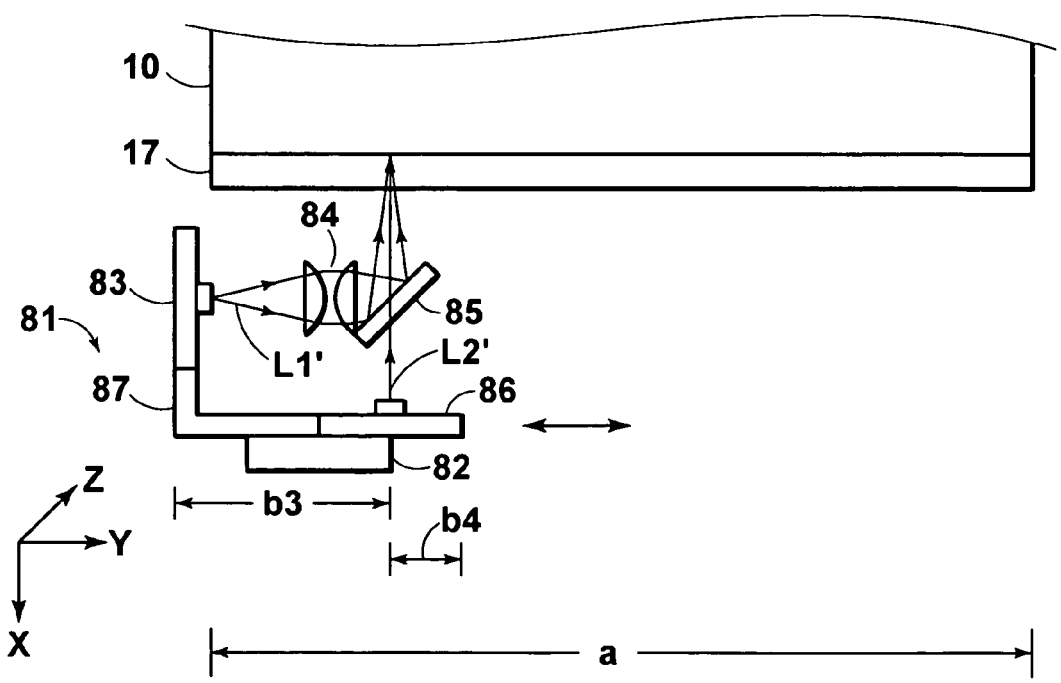
FIG. 3 is a schematic sectional view of the readout exposure portion according to a second embodiment of the present invention.

Next, a second embodiment of the present invention will be described with reference to FIG. 1 and FIG. 3. The general construction of the second embodiment is substantially the same as that of the first embodiment. Therefore, reference numbers are added to FIG. 1 in parentheses, only for parts that differ from those of the first embodiment. In FIG. 3, elements which are the same as those illustrated in FIG. 2 are labeled with the same reference numerals, and descriptions thereof will be omitted, insofar as they are not particularly necessary.

As illustrated in FIG. 1, an image information recording/readout apparatus 2 according to the second embodiment comprises: an image recording medium 10; an illuminating portion 81; a scanning portion 82; a scanning exposure control portion 90; a current detecting circuit 50; a radiation emitting portion 60; and a control portion 70. The image recording medium 10 is capable of recording an electrostatic latent image therein. The illuminating portion 81 emits pre-exposure light L2' and readout light L1' onto the image recording medium 10. The scanning portion 82 scans the illuminating portion 81. The illuminating portion 81 and the scanning portion 82 constitute a readout exposure portion 80. The scanning exposure control portion 90 controls the readout exposure portion 80. The current detecting circuit 50 reads out charges from the image recording medium 10. The radiation emitting portion 60 emits radiation L3. The control portion 70 is connected to the scanning exposure control portion 90, the current detecting circuit 50, and the radiation emitting portion 60.

FIG. 3 is a sectional view of the illuminating portion 81 along the X-Y plane. The illuminating portion 81 comprises: a readout light source 83, which is a first light source; a focusing optical system 84; a dichroic mirror 85; a preexposure light source 86, which is a second light source; and an L-shaped metal clasp 87. The readout light source 83 comprises a great number of LED's that emit light at wavelengths of approximately 460 nm, which are arranged linearly in the Z direction. The focusing optical system 84, comprises two cylindrical lenses that extend in the Z direction, and focuses light emitted from the readout light source 83, that is, readout light L1', on the image recording medium 10, as a line extending in the Z direction. The dichroic mirror 85 changes the optical path from the Y direction to the X direction, to cause the readout light L1' to be incident on the image recording medium 10 at a right angle. The preexposure light source 86 comprises a great number of EL (electrical luminescence) lamps that emit light at wavelengths of approximately 460 nm, which are arranged linearly in the Z direction. The L-shaped metal clasp 87 serves to integrate the pre-exposure light source 86 and the readout light source 83. The focusing optical system 84 and the dichroic mirror 85 are fixed to the readout light source 83 and the pre-exposure light source 86 by a mounting member (not shown).

The scanning portion 82 scans the illuminating portion 81 in the Y direction, according to control by the scanning exposure control portion 90.

The readout exposure portion 80 according to the second embodiment of the present invention comprises the illuminating portion 81, in which the readout light source 83 and the pre-exposure light source 86 are integrated, and the scanning portion 82, for scanning the illuminating portion 81. Therefore, the necessity of an expensive planar light source and separate scanning portions, for individually scanning the pre-exposure light source 86, which had heretofore been necessary, is obviated. Thereby, the manufacturing cost may be reduced, in a similar manner as the first embodiment.

The length of the image recording medium 10 in the sub-scanning direction is designated as a, the distance from the effective emission position of the readout light L1' to the left edge of the illuminating portion 81 is designated as b3, and the distance from the emission position of the preexposure light L2' to the right edge of the illuminating portion 81 is designated as b4, as illustrated in FIG. 3. In this case, in order to scan and expose the entire surface of the image recording medium 10 with the readout light L1' and the pre-exposure light L2', it is necessary to secure scanning space for the illuminating portion 81 of at least a distance of b3 to the left of the length a and of a distance of b4 to the right of the length a. Generally, the distance b3+b4 is less than the distance b1+b2, which is the space necessary to the right and left of length a of the image recording medium 10, when using the readout exposure portion 20 of the first embodiment.

In the readout exposure portion 20 of the first embodiment, the incident position of the pre-exposure light L2 and the incident position of the readout light L1 do not match. Therefore, it is necessary to secure the spaces b1 and b2 on the left and right sides of the length a of the image recording medium 10. On the other hand, in the readout exposure portion 80 of the second embodiment, the dichroic mirror 85 is provided to change the optical path of the readout light L1'. Thereby, the incident positions of the readout light L1' and the pre-exposure light L2' substantially match. Therefore, the scanning space necessary for the illuminating portion 81 may be reduced. Because the dichroic mirror 85 is employed as an optical path changing means, the optical path may be changed efficiently with a simple structure. Note that half mirrors, or mirrors that can be selectively inserted and withdrawn from the optical path may alternatively be used as the optical path changing means.

Image information recording/readout apparatuses that employ the readout exposure portion according to the present invention have been described above. However, the present invention is not limited to the above embodiments.

The present invention may be applied to other types of image information recording/readout apparatuses. An example is an apparatus that erases unnecessary charges, such as residual charges and dark current charges by scanning and exposing the readout light photoconductive layer 14 with pre-exposure light L2 prior to recording of an image with radiation L3. The scanning exposure in this case is performed in a state in which high voltage is being applied between the electrodes of the first electrode layer 11 and the stripe electrodes 16. Another example is an apparatus that obtains readout ranges or dark current correction data by scanning exposure with the pre-exposure light L2 after recording of an image with radiation L3.

What is claimed is:

1. An image information readout exposure apparatus, comprising:
    a first light source, for performing readout scanning exposure on an image information recording medium, on which image information is recordable as an electrostatic latent image, to read out image information recorded thereon; and
    a second light source, for performing scanning exposure on the image information recording medium, which is different from the readout scanning exposure performed by the first light source;
    wherein the first and second light sources comprise:
    an integrated illuminating portion; and
    a scanning means for scanning the illuminating portion.

2. The apparatus as of claim 1, wherein the first and second light sources are linear light sources, and
    wherein the illuminating portion comprises an optical path changing means, for changing an optical path of light emitted from at least one of the first and second light sources, so that a position illuminated by the light emitted from the first light source and a position illuminated by the light emitted from the second light source substantially match.

3. The apparatus of claim 2, wherein the optical path changing means is a dichroic mirror.

4. The apparatus of claim 2, wherein a linear direction of the first light source is perpendicular to a scanning direction of the scanning means.

5. The apparatus of claim 2, wherein a linear direction of the second light source is perpendicular to a scanning direction of the scanning means.

6. The apparatus of claim 2, wherein a linear direction of the first light source is perpendicular to a scanning direction of the scanning means, and
    wherein a linear direction of the second light source is perpendicular to the scanning direction of the scanning means.

7. The apparatus of claim 2, wherein the first light source comprises light emitting diodes (LEDs).

8. The apparatus of claim 7, wherein the LEDs emit light at wavelengths of approximately 460 nm.

9. The apparatus of claim 2, wherein the second light source comprises electrical luminescence (EL) lamps.

10. The apparatus of claim 9, wherein the EL lamps emit light at wavelengths of approximately 460 nm.

11. The apparatus of claim 1, wherein the first light source comprises light emitting diodes (LEDs).

12. The apparatus of claim 11, wherein the LEDs emit light at wavelengths of approximately 460 nm.

13. The apparatus of claim 1, wherein the second light source comprises electrical luminescence (EL) lamps.

14. The apparatus of claim 13, wherein the EL lamps emit light at wavelengths of approximately 460 nm.

* * * * *